(12) United States Patent
Yasui

(10) Patent No.: US 6,341,535 B1
(45) Date of Patent: Jan. 29, 2002

(54) TORQUE DETECTION ASSEMBLY

(75) Inventor: Katsuaki Yasui, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/552,247

(22) Filed: Apr. 19, 2000

(30) Foreign Application Priority Data

Oct. 29, 1999 (JP) .......................................... 11-308931

(51) Int. Cl.[7] ................................................ G01L 3/02
(52) U.S. Cl. ................................................ 73/862.333
(58) Field of Search ....................... 73/862.331–862.338

(56) References Cited

U.S. PATENT DOCUMENTS

| | | | |
|---|---|---|---|
| 5,578,767 A | * 11/1996 | Chikaraishi et al. ... | 73/862.331 |
| 6,223,607 B1 | * 5/2001 | Yasui .................... | 73/862.333 |
| 6,223,608 B1 | * 5/2001 | Yasui .................... | 73/862.333 |

FOREIGN PATENT DOCUMENTS

| | | | |
|---|---|---|---|
| JP | 6-174569 | 6/1994 | ............. G01L/3/10 |

* cited by examiner

*Primary Examiner*—Benjamin R. Fuller
*Assistant Examiner*—Jewel V. Thompson
(74) *Attorney, Agent, or Firm*—Sughrue Mion, PLLC

(57) ABSTRACT

The thickness of a yoke and magnetic elements in a torque detection assembly is not more than twice a skin depth $\delta$ calculated by a formula:

$$\delta = \sqrt{(2\rho/(2\pi \cdot F \cdot \mu s \cdot \mu_0))} \tag{1}$$

where $\rho$ is the specific resistance of the magnetic elements,

F is the frequency of the magnetic field, $\mu s$ is the specific permeability of the magnetic elements, and $\mu_0$ is the permeability of a vacuum.

8 Claims, 6 Drawing Sheets

TORQUE DETECTION ASSEMBLY

BACKGROUND OF THE INVENTION

1. Field of the Invention

The present invention relates to a torque detection assembly for detecting torque without direct contact when external force is applied to a rotating shaft such as a power-steering mechanism of an automobile.

2. Description of the Related Art

In an automotive power-steering mechanism, it is necessary to detect the amount of torque being applied to a steering wheel to determine the amount of power assistance required. Torque detection assemblies for this purpose have been disclosed in Japanese Patent Laid-Open No. 6-174569, for example. The construction of this device will be explained with reference to FIG. 8.

This torque detection assembly includes:

a case 4;

a torsion bar 3 disposed on a central axis of a first shaft 1 attached to a steering wheel (not shown) and a second shaft 2 attached to a pinion gear of a steering mechanism (not shown), the torsion bar 3 being an elastic member connecting the first shaft and the second shaft so as to be elastic in the circumferential direction (the direction of torsion);

a bearing 5 disposed between the case 4 and the first shaft 1, the bearing 5 rotatably supporting the first shaft 1;

a first sleeve 14a composed of a non-magnetic body fastened to the first shaft 1;

a second sleeve 14b composed of a non-magnetic body fastened to the second shaft 2;

a first magnetic element 11 and second magnetic element 12 composed of soft magnetic material fastened to the first sleeve 14a; and a third magnetic element 13 composed of soft magnetic material fastened to the second sleeve 14b. Teeth 11a are formed in the first magnetic element 11 opposite the second magnetic element 12. Teeth 12a and 13a are formed in the second magnetic element 12 and the third magnetic element 13 opposite each other.

The torque detection assembly also includes:

a first coil 21a disposed around the first magnetic element 11 and the second magnetic element 12;

a first yoke 22a secured to the case 4 so as to surround the outside of the first coil 21a, the first yoke 22a having an internal flange;

a second coil 21b disposed around the second magnetic element 12 and the third magnetic element 13; and a second yoke 22b secured to the case 4 so as to surround the outside of the second coil 21b, the second yoke 22b having an internal flange.

In order to maintain structural strength, the first to third magnetic elements 11 to 13, the first yoke 22a, and the second yoke 22b are made of a metallic magnetic body having a thickness of 1 to 2 mm, or ferrite having a thickness of 3 to 5 mm. If ferrite, which has low electric conductivity, is used, the magnetic properties are such that highly-sensitive frequency response can be achieved to high frequencies, but because ferrite is extremely brittle and expensive, it is difficult to use in mass-produced goods.

Next, the operation of the above torque detection assembly will be explained. When torque from the steering wheel is applied to the first shaft 1, torsional deformation occurs in the torsion bar 3, and relative angular shear occurs in the circumferential direction between the first shaft 1 and the second shaft 2. Thus, a relative displacement in the circumferential direction occurs between the second magnetic element 12, which is fastened to the first shaft by means of the first sleeve 14a, and the third magnetic element 13, which is fastened by means of the second sleeve 14b, changing the opposing surface area between the teeth 12a of the second magnetic element 12 and the teeth 13a of the third magnetic element 13. Magnetic flux is generated in the second coil 21b by the passage of an alternating drive current, and the magnetic flux passes through a magnetic circuit formed by the second yoke 22b, the second magnetic element 12, and the third magnetic element 13. When the opposing surface area between the teeth 12a and the teeth 13a, which forms a magnetic pathway, is altered, the reluctance of the magnetic circuit changes, changing the inductance of the second coil 21b. The torque is obtained by detecting this change in inductance using a detection circuit (not shown).

Because the second coil 21b allows the generation of eddy currents in the magnetic elements and the yokes, the inductance of the second coil 21b is reduced compared to a hypothetical case in which ideal magnetic elements and yokes which do not generate eddy currents are used. If the magnetic permeability of the magnetic elements and the yoke is constant, then the lower the resistivity, the greater the degree of reduction of the inductance. Because the resistivity of metallic materials is higher at high temperatures, except in special cases, resistivity falls at lower temperatures and the influence of eddy currents increases. Consequently, because the degree of influence of eddy currents depends on temperature, when the assembly is used in environments where temperature fluctuations occur, temperature compensation is required.

Because the first magnetic element 11 and the second magnetic element 12 are both fastened to the first shaft 1 by means of the first sleeve 14a, the relative angular shear between the first magnetic element 11 and the second magnetic element 12 does not change even if torque is applied, and the inductance of the first coil 21a, which is disposed around an intermediate position between the first magnetic element 11 and the second magnetic element 12, does not change. However, because the inductance of the first coil 21a is changed by changes in temperature in the same manner as the second coil 21b, it is possible to obtain an output unaffected by temperature and related only to the torque by detecting the difference in inductance between the first coil 21a and the second coil 21b.

Now, the voltage generated in the second coil 21b by the passage of the alternating drive current through the second coil 21b is an alternating voltage synchronized with the frequency of the drive current, because output from the torque detection assembly to an ac/dc converter must be in the form of a direct voltage or a direct current proportional to the torque, a low pass filter is required to remove ripples synchronized with the frequency of the alternating drive current and make the output a smooth direct current. Because the drive frequency of the second coil 21b is in the range of a few kHz, the time constant of this low pass filter must be less than a few hundred Hz. Consequently, it is not possible to increase responsiveness to the torque output beyond a few hundred Hz, which is the time constant of the low pass filter.

In recent years, in order to increase responsiveness in automotive power steering mechanisms, a responsiveness of several kHz, an order of magnitude faster than the conventional art, has been sought from torque detection assemblies.

In order to meet this demand, it has been necessary to increase the frequency of the drive current by an order of magnitude to between several tens of kHz and 100 kHz.

However, when the frequency of the drive current is increased in a conventional torque detection assembly, the inductance of the second coil 21b and the sensitivity of the inductance to torque is reduced due to the influence of eddy currents, and for that reason, one problem has been that the speed of responsiveness cannot be increased. Because of poor temperature characteristics and variation resulting from eddy currents, another problem has been that it is difficult to achieve complete temperature compensation when operating at low temperatures.

SUMMARY OF THE INVENTION

The present invention aims to solve the above problems and an object of the present invention is to provide a torque detection assembly having quick response and superior temperature characteristics.

To this end, according to the present invention, there is provided a torque detection assembly wherein the thickness of a yoke and magnetic elements are not more than twice a skin depth $\delta$ calculated by a formula:

$$\delta = \sqrt{(2\rho/(2\pi \cdot F \cdot \mu s \cdot \mu_0))}$$

where $\rho$ is the specific resistance of said magnetic elements,

F is the frequency of the magnetic field, $\mu s$ is the specific permeability of said magnetic elements, and $\mu_0$ is the permeability of a vacuum.

According to another aspect of the present invention, there is provided a torque detection assembly wherein a yoke is divided into a number of structural elements in a circumferential direction, the structural elements are electrically insulated from each other in portions through which the magnetic flux generated by a coil passes.

According to still another aspect of the present invention, there is provided a torque detection assembly wherein magnetic elements are divided into a number of structural elements in a circumferential direction, the structural elements are electrically insulated from each other in portions through which the magnetic flux generated by a coil passes.

DETAILED DESCRIPTION OF THE PREFERRED EMBODIMENTS

Figure 8:
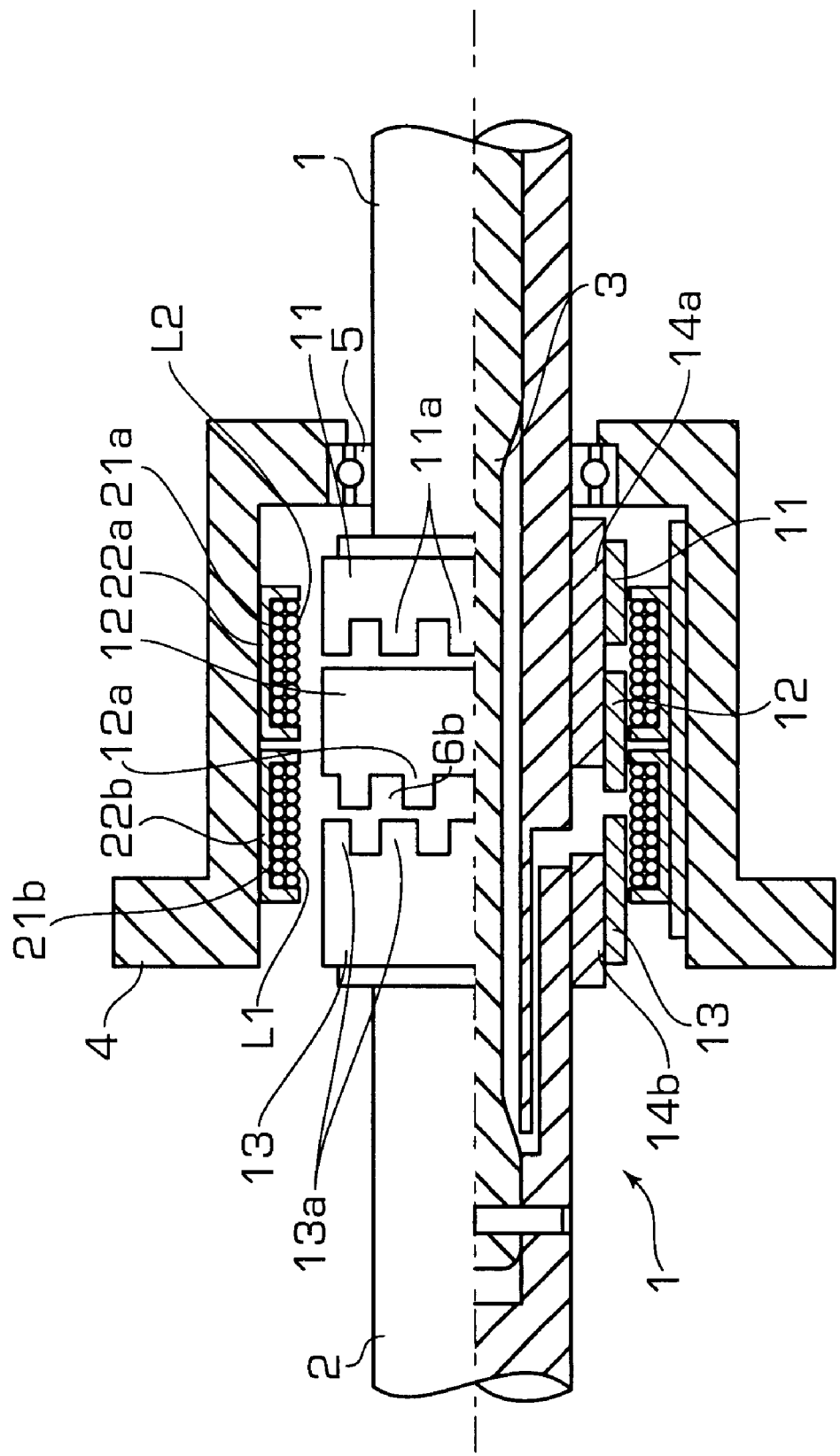
FIG. 8 is a partial frontal cross section showing a conventional torque detection assembly.

The preferred embodiments of the present invention will be explained below with reference to the drawings. In each of the drawings, parts the same as or corresponding to those of the conventional example in FIG. 8 will be given the same numbering.

Embodiment 1

Figure 1:
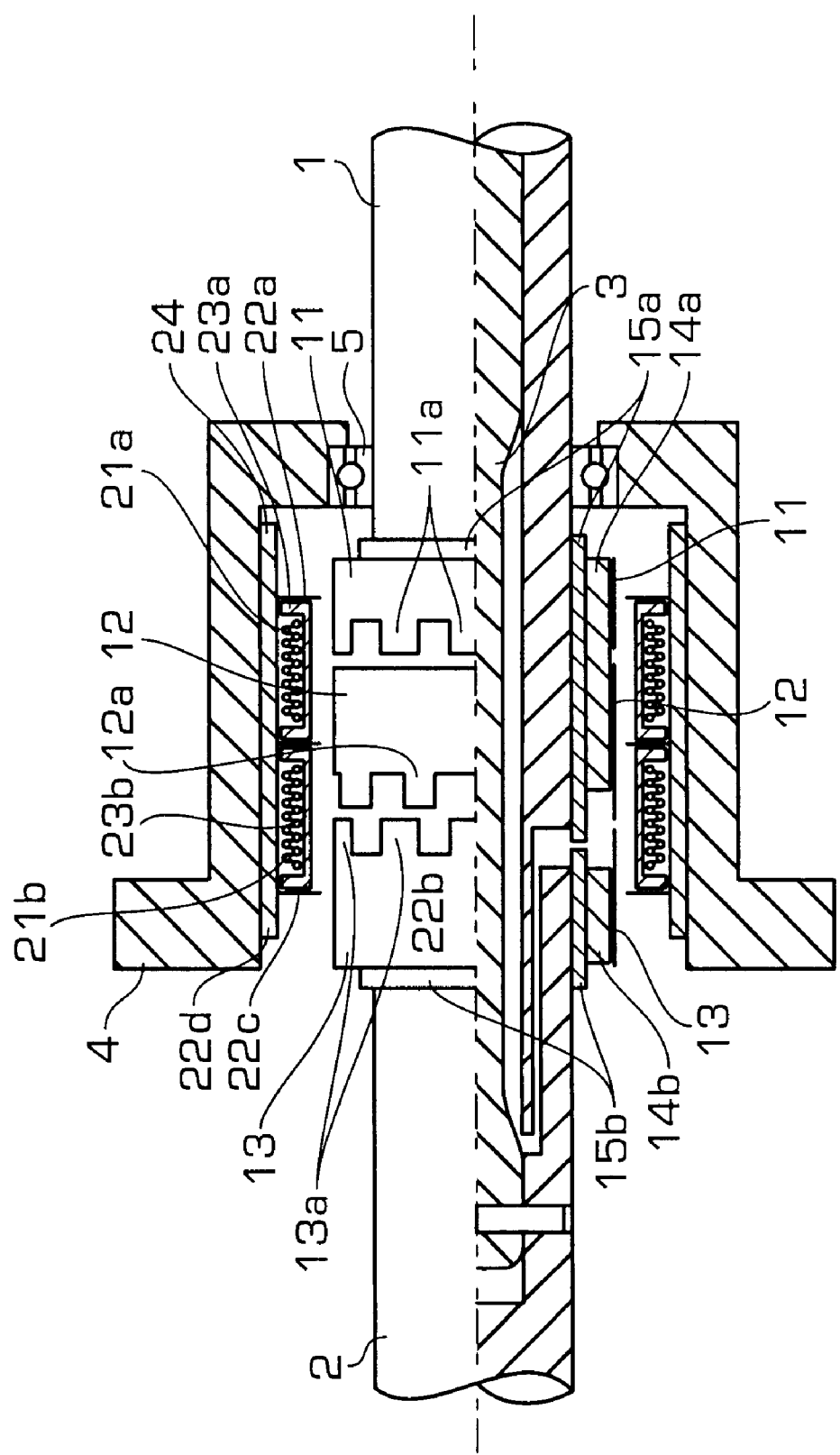
FIG. 1 is a partial frontal cross section of a torque detection assembly according to Embodiment 1 of the present invention.

FIG. 1 is a partial frontal cross section of a torque detection assembly according to Embodiment 1 of the present invention.

This torque detection assembly includes:

a case 4;

a torsion bar 3 disposed on a central axis of a first shaft 1 attached to a steering wheel (not shown) and a second shaft 2 attached to a pinion gear of a steering mechanism (not shown), the torsion bar 3 being an elastic member connecting the first shaft and the second shaft so as to be elastic in the circumferential direction (the direction of torsion);

a bearing 5 disposed between the case 4 and the first shaft 1, the bearing 5 rotatably supporting the first shaft 1;

a cylindrical copper first magnetic shield 15a fastened to the first shaft 1;

a cylindrical copper second magnetic shield 15b fastened to the second shaft 2;

a cylindrical resin first sleeve 14a which is a non-magnetic body fastened to an outer circumference of the first magnetic shield 15a;

a cylindrical resin second sleeve 14b which is a non-magnetic body fastened to an outer circumference of the second magnetic shield 15b;

a first magnetic element 11 and second magnetic element 12 composed of cobalt based amorphous metal having a thickness of 20 $\mu$m fastened to the first sleeve 14a; and a third magnetic element 13 also composed of amorphous metal fastened to the second sleeve 14b. Teeth 11a are formed in the first magnetic element 11 opposite the second magnetic element 12. Teeth 12a and 13a are formed in the second magnetic element 12 and the third magnetic element 13 opposite each other. Moreover, gaps are shown in the diagram to distinguish between the first magnetic element 11 and the first sleeve 14a, and the second magnetic element 12 and the first sleeve 14a, and to distinguish between the third magnetic element 13 and the second sleeve 14b, but these are actually in close contact.

This torque detection assembly also includes:

first and second resin bobbins 23a and 23b disposed around a position between the first and second magnetic elements 11 and 12 and a position between the second and third magnetic elements 12 and 13, respectively;

a first and second coil 21a and 21b wound onto each of the bobbins;

doughnut-shaped yokes 22a to 22c composed of amorphous metal disposed around the circumference of a side surface of the first bobbin 23a and the second bobbin 23b;

a cylindrical yoke 22d composed of amorphous metal fastened to edge surfaces of the yokes 22a to 22c, the cylindrical yoke 22d covering the yokes 22a to 22c; and a cylindrical resin third sleeve 24 having the yoke 22d fastened to its inner wall and its outer wall secured to the case 4. The yokes 22a to 22d and the magnetic elements 11 to 13 are composed of amorphous metal having the same thickness of 20 µm.

Next, the operation of a torque detection assembly of the above construction will be explained. The basic operation is exactly the same as for the conventional example. When torque from the steering wheel is applied to the first shaft 1, torsional deformation occurs in the torsion bar 3, causing relative angular shear in the circumferential direction between the first shaft 1 and the second shaft 2. Then, a relative displacement in the circumferential direction occurs between the second magnetic element 12, which is fastened to the first shaft by means of the magnetic shield 15a and the first sleeve 14a, and the third magnetic element 13, which is fastened by means of the magnetic shield 15b and the second sleeve 14b, changing the opposing surface area between the teeth 12a of the second magnetic element 12 and the teeth 13a of the third magnetic element 13.

Magnetic flux is generated in the second coil 21b by the passage of an alternating drive current, and the magnetic flux passes through a magnetic circuit formed by the yoke 22b, the yoke 22d, the yoke 22c, the second magnetic element 12, and the third magnetic element 13. When the opposing surface area between the teeth 12a and the teeth 13a, which forms a magnetic pathway, is altered, the reluctance of the magnetic circuit changes, changing the inductance of the second coil 21b. The torque is obtained by detecting this change in inductance using a detection circuit (not shown).

Although the influence on the inductance of the second coil 21b is substantially less than on the conventional torque detection assembly, since the inductance changes according to the temperature, it is necessary to perform temperature compensation when high precision is required. Because the first magnetic element 11 and the second magnetic element 12 are both fastened to the first shaft 1 by means of the first sleeve 14a and the magnetic shield 15a, the relative angular shear between the first magnetic element 11 and the second magnetic element 12 does not change even if torque is applied, and the inductance of the first coil 21a, which is disposed around an intermediate position between the first magnetic element 11 and the second magnetic element 12, does not change. However, because the inductance of the first coil 21a is changed by changes in temperature in the same manner as the second coil 21b, it is possible to obtain an output unaffected by temperature and related only to the torque by detecting the difference in inductance between the first coil 21a and the second coil 21b. Because the basic temperature characteristics of each of the coils are better than in the conventional torque detection assembly, it is possible to achieve more precise temperature compensation.

Now, generally, when a high-frequency alternating magnetic field is applied to a magnetic body, the magnetic flux in practice only passes through the surface of the magnetic body. The thickness of the portion through which the magnetic flux passes is called the skin depth δ, and is known to be given by the following formula:

$$\delta = \sqrt{(2\rho/(2\pi \cdot F \cdot \mu s \cdot \mu_0))}$$

where
ρ is the specific resistance of the magnetic body,
F is the frequency of the magnetic field,
µs is the specific permeability of the magnetic body, and
$\mu_0$ is the permeability of a vacuum.

At a point where the depth from the surface of the magnetic body is in the vicinity of the skin depth δ, a large eddy current arises in a direction which cancels out the alternating magnetic field, and the magnetic field does not reach much deeper than that point. Consequently, when the magnetic body is a plate, the effective area through which the magnetic flux passes is reduced by the influence of the eddy current if the thickness of the plate is greater than 2 δ because the magnetic flux penetrates from the front and rear surfaces.

In this embodiment, the yokes 22a to 22d and the magnetic elements 11 to 13, which form the magnetic circuit, are composed of amorphous metal having a thickness of 20 µm. Because the properties of this amorphous metal material include a specific permeability µs of 10,000 and a specific resistance ρ of 136 µΩcm, the skin depth δ at a frequency F of 100 kHz obtained by Formula (1) is 19 µm. In this embodiment, because the thickness of the amorphous metal is 20 µm, which is sufficiently thinner than 2 δ, the influence of eddy currents can be reduced greatly.

Furthermore, because the magnetic elements 11 to 13 and the yokes 22a to 22d are insulated from the conductive structural elements by the non-conductive resin sleeves 14a and 14b and the bobbins 23a and 23b, eddy currents are prevented from flowing through the conductive structural elements and reducing inductance.

Because the magnetic elements 11 to 13 and the yokes 22a to 22d are composed of amorphous metal, they have great mechanical strength and their resilience is therefore high.

Because copper magnetic shields 15a and 15b are provided between the magnetic elements 11 to 13 and the first and second shafts 1 and 2, the ratio of magnetic flux which, having leaked from the magnetic circuit, flows through the first and second shafts 1 and 2 is small, and thus even if carbon steel, which is cheap but has poor magnetic characteristics with regards to temperature, is used as the material for the first and second shafts 1 and 2, any adverse effects which the temperature characteristics have on output can be reduced.

Moreover, in this embodiment, amorphous metal was used for the portions forming the magnetic circuit, but any other soft magnetic material may also be used. For example, when the magnetic materials are composed of a generic electromagnetic stainless steel, if the electromagnetic stainless steel has a specific permeability µs of 850 and a specific resistance of 57 µΩcm, the skin depth δ at a magnetic field frequency F of 100 kHz is approximately 40 µm and 2 δ is 80 µm. When a magnetic material having a high permeability and higher performance than electromagnetic stainless steel is used, because 2 δ is even thinner, the plate thickness must be less than 80 µm.

In this embodiment, because high-precision temperature compensation is performed, a pair of coils have been used, but the coil 21a for temperature compensation and the surrounding magnetic circuit may also be omitted and the torque obtained using one coil 21b only. Since the temperature characteristics of the coil are good, when the range of operating temperatures is small or when a high degree of precision is not required, the temperature compensation coil can be easily dispensed with.

In this embodiment, whereas 2 δ at a drive frequency of 100 kHz was 38 µm, amorphous metal plate having a thickness of 20 µm, which is approximately half that, was used in the magnetic elements and the yokes, but even thinner plate may be used. For example, using the above electromagnetic stainless steel, when the drive frequency is 3 kHz, 2 δ is 480 µm, but by using a much thinner plate thickness such as 80 µm, for example, temperature characteristics can be improved further. However, when the plate thickness is reduced to an extreme, the cross-sectional area of the magnetic circuit is reduced, and because the magnetization will become saturated if the drive current is increased, the drive current must be limited to a range in which the magnetization is not saturated.

Embodiment 2

Figure 2:
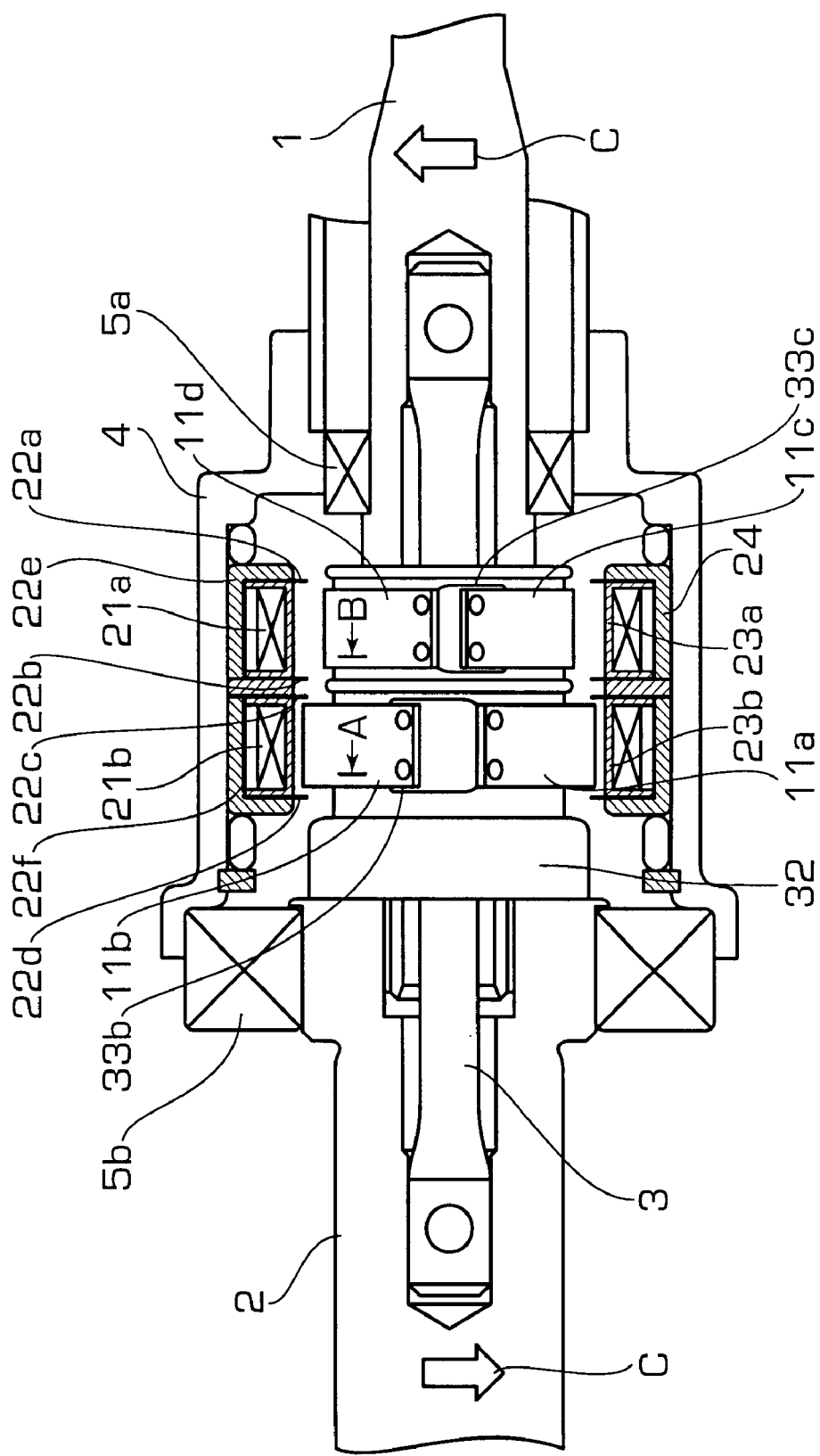
FIG. 2 is a partial frontal cross section of a torque detection assembly according to Embodiment 2 of the present invention.
Figure 3:
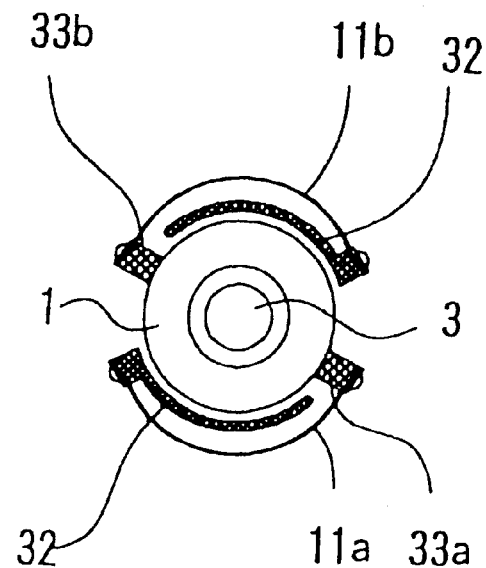
FIG. 3 is a cross section seen from the direction of the arrow A in FIG. 2.
Figure 4:
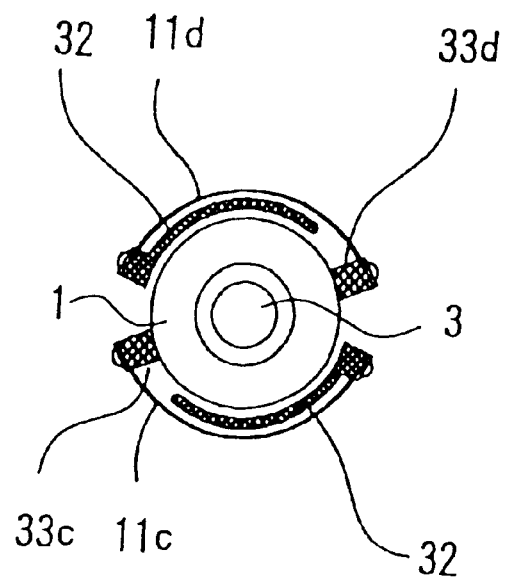
FIG. 4 is a cross section seen from the direction of the arrow B in FIG. 2.

FIG. 2 is a partial frontal cross section showing a torque detection assembly according to Embodiment 2 of the present invention. FIG. 3 is a cross section seen from the direction of the arrow A in FIG. 2 and FIG. 4 is a cross section seen from the direction of the arrow B in FIG. 2, representing a case where torque is being applied between the first shaft 1 and the second shaft 2 in the direction of the arrows C.

In this torque detection assembly doughnut-shaped yokes 22a to 22d composed of amorphous metal are disposed on side surfaces of the bobbins 23a and 23b, and cylindrical yokes 22e and 22f composed of amorphous metal are disposed around an outer circumference of the yokes 22a to 22d. The coils 21a and 21b, the bobbins 23a and 23b, and the yokes 22a to 22f are fastened to the case 4 by means of the resin sleeve 24.

The left-hand end surfaces of aluminum first and second support member 32, which have an arc-shaped cross section, are secured to an end surface of the second shaft. The first and second support members 32a, 32b cover an extension of the first shaft 1 to the left of the bearing 5a, and the tips thereof extend as far as the right-hand side of the yoke 22a. Support members 33a to 33d are secured to an outer circumferential surface of the extension of the first shaft 1. One end of a magnetic element 11a is secured to one side of the support member 32a, and the other end of this magnetic element 11a is secured to the support member 33a. One end of a magnetic element 11b is secured to one side of the support member 32b, and the other end of this magnetic element 11a is secured to the support member 33b. One end of a magnetic element 11c is secured to one side of the support member 32a, and the other end of this magnetic element 11c is secured to the support member 33c. One end of a magnetic element 11d is secured to one side of the support member 32b, and the other end of this magnetic element 11d is secured to the support member 33d. The magnetic elements 11a to 11d and the yokes 22a to 22f are composed of cobalt based amorphous metal sufficiently thinner than twice the skin depth $\delta$ at 100 kHz.

Furthermore, middle portions of the magnetic elements 11a to 11d are designed to be positioned radially outside the inner edge surfaces of the doughnut-shaped yokes 22a to 22d when the middle portions of the magnetic elements 11a to 11d are displaced radially outwards by a maximum amount due to the application of torque.

Next, the operation of a torque detection assembly of the above construction will be explained. When torque from the steering wheel is applied to the first shaft 1, torsional deformation occurs in the torsion bar 3, causing relative angular shear in the circumferential direction between the first shaft 1 and the second shaft 2. When relative displacement in the circumferential direction occurs between the support members 33a to 33d, which are secured to the first shaft, and the support members 32a and 32b, which are secured to the second shaft 2, the middle portions of the magnetic elements 11a and 11b bend radially outwards, as shown in FIG. 3, and at the same time, the middle portions of the magnetic elements 11c and 11d are displaced radially inwards, as shown in FIG. 4.

The magnetic flux generated by the first coil 21a passes through the magnetic circuit formed by the yokes 22b, 22e, and 22a and the magnetic elements 11c and 11d, and the magnetic flux generated by the second coil 21b passes through the magnetic circuit formed by the yokes 22d, 22f, and 22c and the magnetic elements 11a and 11b. Since the yokes 22a to 22f and the magnetic elements 11a to 11d are composed of cobalt based amorphous metal, which is a soft magnetic material, making their reluctance extremely low, the reluctance of these magnetic circuits is mainly determined by the size of the air gaps between the yokes 22a to 22d and the magnetic elements 11a to 11d. Consequently, when torque from the steering wheel is applied to the first shaft 1, in the magnetic circuit in which the magnetic flux from the second coil 21b flows, the inductance is increased because the air gap is small and reluctance is low, and in the magnetic circuit in which the magnetic flux from the first coil 21a flows, the inductance is reduced because the air gap is large and reluctance is high. The amount of torsion in the torsion bar 3, and thus the magnitude of the torque, can be deduced by detecting this change in inductance electrically.

In this embodiment, because the magnetic elements 11a to 11d and the yokes 22a to 22f are composed of cobalt based amorphous metal sufficiently thinner than twice the skin depth 5 at 100 kHz, they are not easily influenced by eddy currents even in the high-frequency region.

Figure 5:
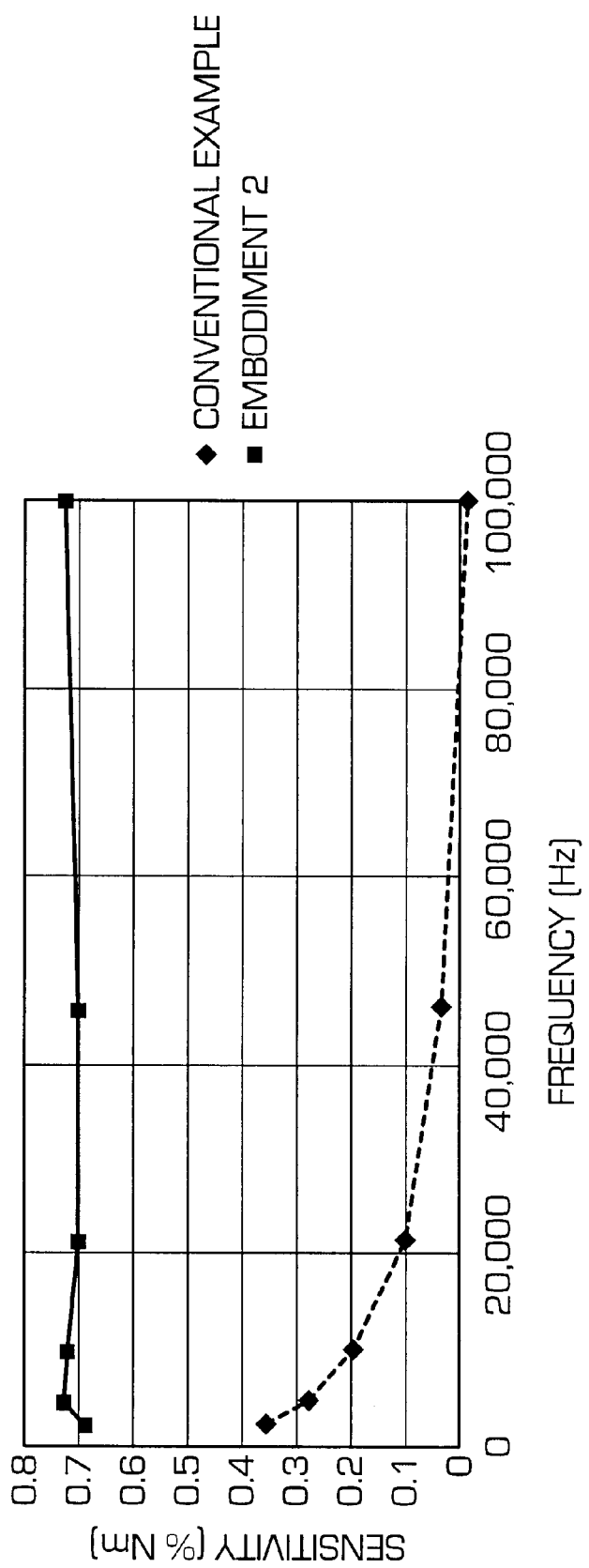
FIG. 5 is a graph of actual measurements showing the frequency characteristics of the torque sensitivity of inductances of coils.

FIG. 5 is a graph of actual measurements of the rate of change in inductance in the torque detection assembly according to Embodiment 2 and in a conventional torque detection assembly. From the graph, it can be seen that whereas in the conventional torque detection assembly torque sensitivity drops significantly in the high-frequency region and sensitivity is substantially nonexistent at 100 kHz, in the torque detection assembly according to Embodiment 2, the absolute value of sensitivity is high and remains substantially constant through to 100 kHz.

The reluctance of the magnetic circuits is mainly determined by the size of the air gaps between the yokes 22a to 22d and the magnetic elements 11a to 11d. If the axial width of the magnetic elements is greater than the spacing between the yokes, the middle portions of the magnetic elements are positioned radially inside the yokes even when the magnetic elements are bent outwards by a maximum amount due to the application of torque, and the magnetic elements project axially outside the yokes. Consequently, the rate of change in the inductance of the first coil when the middle portions of the magnetic elements approach the inside diameter of the yokes becomes much greater than the rate of change in the inductance of the first coil when the magnetic elements are displaced radially inwards, and linearity is lost.

In this embodiment, because the middle portions of the magnetic elements 11a to 11d are designed to be positioned radially further outwards than the inner edge surfaces of the doughnut-shaped yokes 22a to 22d when the middle portions of the magnetic elements 11a to 11d are displaced radially outwards by a maximum amount due to the application of torque, the magnetic elements will not approach the yokes too closely even when the magnetic elements are bent outwards by a maximum amount, thus improving linearity.

Embodiment 3

In Embodiments 1 and 2, magnetic pathways were formed by members extending circumferentially, namely the doughnut-shaped yokes along side surfaces of the bobbins and the cylindrical yokes covering the entire body, but a magnetic circuit may also be formed by a number of structural elements such as yokes 22 spaced at intervals circumferentially.

Figure 6:
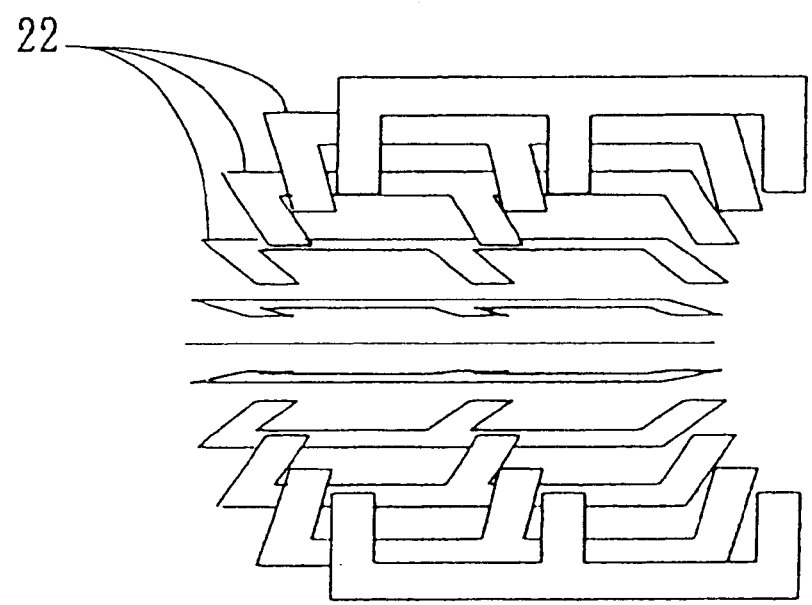
FIG. 6 is a partial perspective of Embodiment 3 of the present invention.

FIG. 6 is a partial perspective of a torque detection assembly according to Embodiment 3 of the present invention. The yokes 22 are composed of structural elements composed of cobalt based amorphous metal having an E-shaped plate and a thickness of 20 μm spaced at even pitch circumferentially and integrated by means of insulation (not shown). The protrusions on the right-hand end, the center, and the left-hand end of the yoke 22 shown in FIG. 6 correspond to the yokes 22a, 22b, and 22c, respectively, of Embodiment 1, and the connecting portion of the yoke 22 corresponds to the yoke 22d of Embodiment 1.

Because the wire constituting the coils is wound around the axis, eddy currents induced in the yoke 22 by the drive currents in the coils try to flow in a direction which cancels out the drive currents flowing in the circumferential direction. Consequently, because the yoke 22 is composed of a number of structural elements spaced circumferentially, eddy currents can be cut off, enabling eddy current loss to be significantly reduced.

The construction of Embodiment 3 is complicated, but compared to Embodiments 1 and 2, it has vastly superior characteristics, providing a torque detection assembly having good temperature characteristics, increased drive current frequency, and quick response.

Embodiment 4

In Embodiment 1, the magnetic elements were formed by members extending circumferentially, but structural elements such as magnetic elements disposed circumferentially at even pitch may also be used.

Figure 7:
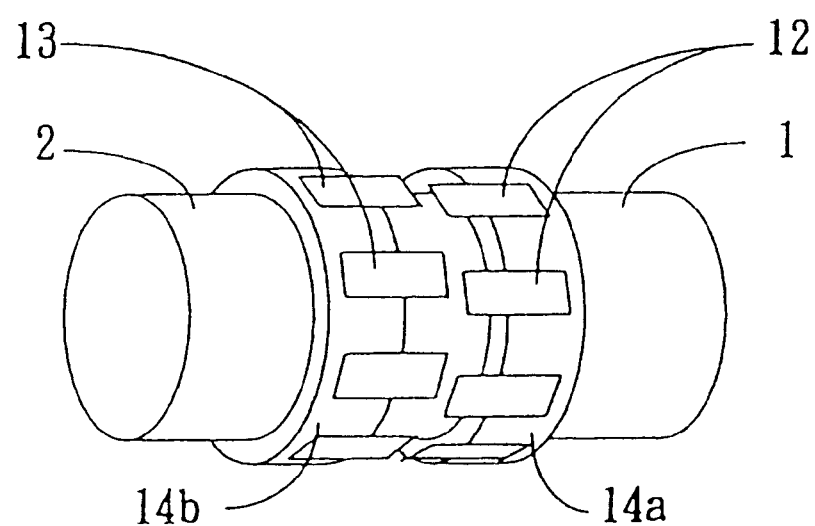
FIG. 7 is a partial perspective of Embodiment 4 of the present invention.

FIG. 7 is a partial perspective of a torque detection assembly according to Embodiment 4 of the present invention.

Embodiment 4 differs from Embodiment 1 in that the second magnetic element 12 is composed of a number of structural elements disposed circumferentially at even pitch, and the third magnetic element 13 is composed of a number of structural elements disposed circumferentially at even pitch. The second magnetic element 12 and the third magnetic element 13 are composed of cobalt based amorphous metal having a thickness of 20 μm.

In Embodiment 4, as in Embodiment 3, circumferential eddy current flowing through the magnetic elements 12 and 13 are cut off, providing a torque detection assembly having good temperature characteristics, increased drive current frequency, and quick response.

Moreover, in addition to the structural elements of magnetic elements disposed circumferentially at even pitch, a yoke including structural elements such as those of Embodiment 3 may also be used.

As explained above, in a torque detection assembly according to one aspect of the present invention, the thickness of a yoke and magnetic elements are not more than twice a skin depth 6 calculated by a formula:

$$\delta = \sqrt{(2\rho/(2\pi \cdot F \cdot \mu s \cdot \mu_0))}$$

where

ρ is the specific resistance of said magnetic elements,

F is the frequency of the magnetic field,

μs is the specific permeability of said magnetic elements, and $\mu_0$ is the permeability of a vacuum.

Therefore, the effects of eddy currents are minimized, providing a torque detection assembly having good temperature characteristics, increased coil drive current frequency, and quick response.

A torque detection assembly according to another aspect of the present invention comprises a yoke being divided into a number of structural elements in a circumferential direction, the structural elements being electrically insulated from each other in portions through which the magnetic flux generated by a coil passes. Therefore, eddy current loss in the yoke can be significantly reduced, providing a torque detection assembly having good temperature characteristics, increased coil drive current frequency, and quick response.

A torque detection assembly according to still another aspect of the present invention comprises magnetic elements being divided into a number of structural elements in a circumferential direction, the structural elements being electrically insulated from each other in portions through which the magnetic flux generated by a coil passes. Therefore, eddy current loss in the magnetic elements can be significantly reduced, providing a torque detection assembly having good temperature characteristics, increased coil drive current frequency, and quick response.

According to another form of the torque detection assembly, the magnetic elements and the yoke may be composed of plate comprising soft magnetic material having a thickness of not more than 80 μm. Therefore, a torque detection assembly having good temperature characteristics, increased coil drive current frequency, and quick response can be provided inexpensively.

According to still another form of the torque detection assembly, the magnetic elements and the yoke may be composed of amorphous metal plate. Therefore, magnetic characteristics and mechanical strength are excellent.

According to still another form of the torque detection assembly, main portions of the magnetic elements and the yoke may be not permitted to be in close contact with conductive members. Therefore, eddy currents are prevented from flowing through the conductive members and reducing inductance in the coil.

According to still another form of the torque detection assembly, magnetic shields may be interposed between the magnetic elements and the first shaft, the second shaft. Therefore, the ratio of magnetic flux which has leaked from the magnetic circuit flowing through the first and second shafts is small, and thus even if carbon steel, which is cheap but has poor magnetic characteristics with regards to temperature, is used as the material for the first and second shafts, any adverse effects the temperature characteristics have on output can be reduced.

According to still another form of the torque detection assembly, middle portions of the magnetic elements may be designed to be positioned radially further outwards than inner edge surfaces of doughnut-shaped yokes when the middle portions of the magnetic elements are displaced radially outwards by a maximum amount. Therefore, output characteristics are prevented from becoming nonlinear due to the air gaps between the magnetic elements and the yoke becoming too small.

What is claimed is:

1. A torque detection assembly comprising:

an elastic member disposed between a first shaft and a second shaft, said elastic member allowing torsional displacement to occur between said first shaft and said second shaft in response to torque acting between said first shaft and said second shaft;

magnetic elements each being fastened to said first shaft and said second shaft, said magnetic elements being displaced by said torsional displacement between said first shaft and said second shaft;

a coil wound so as to surround said magnetic elements, magnetic flux being generated by passage of an alternating drive current through said coil; and a yoke disposed so as to surround said coil, said yoke guiding said magnetic flux to said magnetic elements, the thickness of said yoke and said magnetic elements being not more than twice a skin depth δ calculated by a formula:

$$\delta = \sqrt{(2\rho/(2\pi \cdot F \cdot \mu s \cdot \mu_0))} \quad (1)$$

where

ρ is the specific resistance of said magnetic elements,

F is the frequency of the magnetic field,

μs is the specific permeability of said magnetic elements, and $\mu_0$ is the permeability of a vacuum.

2. A torque detection assembly comprising:

an elastic member disposed between a first shaft and a second shaft, said elastic member allowing torsional displacement to occur between said first shaft and said second shaft in response to torque acting between said first shaft and said second shaft;

magnetic elements comprising soft magnetic material, both ends of each of said magnetic elements being supported by said first shaft and said second shaft to form arc shapes, curvature of said arcs being changed in response to changes in distance between both ends in response to relative angular shear between said first shaft and said second shaft such that middle portions of said magnetic elements are displaced radially;

a coil wound so as to surround said magnetic elements, magnetic flux being generated by passage of an alternating drive current through said coil; and a yoke disposed so as to surround said coil, said yoke guiding said magnetic flux to said magnetic elements, the thickness of said yoke and said magnetic elements being not more than twice a skin depth δ calculated by a formula:

$$\delta = \sqrt{(2\rho/(2\pi \cdot F \cdot \mu s \cdot \mu_0))} \quad (1)$$

where

ρ is the specific resistance of said magnetic elements,

F is the frequency of the magnetic field,

μs is the specific permeability of said magnetic elements, and $\mu_0$ is the permeability of a vacuum.

3. A torque detection assembly comprising:

an elastic member disposed between a first shaft and a second shaft, said elastic member allowing torsional displacement to occur between said first shaft and said second shaft in response to torque acting between said first shaft and said second shaft;

magnetic elements each being fastened to said first shaft and said second shaft, said magnetic elements being displaced by said torsional displacement between said first shaft and said second shaft;

a coil wound so as to surround said magnetic elements, magnetic flux being generated by passage of an alternating drive current through said coil; and a yoke disposed so as to surround said coil, said yoke guiding said magnetic flux to said magnetic elements, said yoke and/or said magnetic elements being divided into a number of structural elements in a circumferential direction, said structural elements being electrically insulated from each other in portion through which said magnetic flux generated by said coil passes.

4. The torque detection assembly according to claim 1 wherein said magnetic elements and said yoke are composed of plate comprising soft magnetic material having a thickness of not more than 80 μm.

5. The torque detection assembly according to claim 1 wherein said magnetic elements and said yoke are composed of amorphous metal plate.

6. The torque detection assembly according to claim 1 wherein main portions of said magnetic elements and said yoke are not permitted to be in close contact with conductive members.

7. The torque detection assembly according to claim 1 wherein magnetic shields comprising conductive material or highly permeable material are interposed between said magnetic elements and said first shaft, said second shaft.

8. The torque detection assembly according to claim 2 wherein middle portions of said magnetic elements are designed to be positioned radially further outwards than inner edge surfaces of doughnut-shaped yokes when said middle portions of said magnetic elements are displaced radially outwards by a maximum amount.

* * * * *